United States Patent [19]
Dennison

[11] Patent Number: 5,228,329
[45] Date of Patent: Jul. 20, 1993

[54] LEAK DETECTOR FOR FLUID DISTRIBUTION SYSTEMS SERVING INTERMITTENT LOADS

[75] Inventor: Roger E. Dennison, Lexington, Mass.

[73] Assignee: Conservation Devices, Inc., Watertown, Mass.

[21] Appl. No.: 815,055

[22] Filed: Dec. 27, 1991

[51] Int. Cl.$^5$ .................. G01M 3/26; G01N 25/72
[52] U.S. Cl. .................. 73/49.1; 73/40.5 R; 73/49.2; 374/5
[58] Field of Search .............. 73/49.2, 40.5 R, 40, 73/49.2, 49.1; 374/4, 5

[56] References Cited

U.S. PATENT DOCUMENTS

| | | | |
|---|---|---|---|
| 3,765,240 | 10/1973 | Haus, Jr. | 374/5 |
| 4,308,746 | 1/1982 | Covington | 340/605 |
| 4,336,708 | 6/1982 | Hobgood et al. | 374/5 |
| 4,486,103 | 12/1984 | Ando | 374/5 |
| 4,500,865 | 2/1985 | Tanaka et al. | 374/5 |
| 4,529,974 | 7/1985 | Tanaka et al. | 374/5 |
| 4,553,212 | 11/1985 | Hayashi et al. | 73/40.5 R |
| 4,727,748 | 3/1988 | Horigome et al. | 73/40 |
| 4,947,352 | 8/1990 | Jenkins | 374/4 |
| 4,958,296 | 9/1990 | Saitoh et al. | 73/40 |
| 5,065,616 | 11/1991 | Schuster | 73/40 |
| 5,067,094 | 11/1991 | Hayes | 374/4 |
| 5,078,006 | 1/1992 | Maresca, Jr. et al. | 73/40.5 R |

FOREIGN PATENT DOCUMENTS

| | | | |
|---|---|---|---|
| 0155882 | 12/1979 | Japan | 374/4 |
| 0154432 | 12/1980 | Japan | 374/4 |
| 56-79230 | 6/1981 | Japan | 374/4 |

Primary Examiner—Hezron E. Williams
Assistant Examiner—George M. Dombroske
Attorney, Agent, or Firm—Iandiorio & Dingman

[57] ABSTRACT

A leak detector is proposed for fluid systems serving intermittent loads. The device generates a signal representative of the minimum level of flow occurring from time to time, this level of flow being taken as the rate of leakage. On the basis of this signal, the device generates outputs indicative of the presence and relative magnitude of leakage. A preferred form of the device monitors flow with a thermal fluid flow detector which is adapted to be removably mounted on a distribution system pipe and to be sufficiently inexpensive to permit wide application of the device to small fluid distribution systems, such as residential water systems.

17 Claims, 7 Drawing Sheets

FIG. 4
SCHEMATIC BLOCK DIAGRAM

FIG. 7A
SCHEMATIC BLOCK DIAGRAM

FIG. 8
BLOCK DIAGRAM

LEAK DETECTOR FOR FLUID DISTRIBUTION SYSTEMS SERVING INTERMITTENT LOADS

FIELD OF THE INVENTION

This invention relates to a leak detector for fluid distribution systems serving intermittent loads that typically employs thermal detection apparatus.

BACKGROUND OF THE INVENTION

Leakage from fluid distribution systems, such as domestic water systems and compressed-air systems, is common and frequently goes undetected. Toilet leaks are often silent and are detected only when a water bill is excessively high. Leakage from toilets and from faucets in apartment buildings is difficult for the manager to detect and thus to deal with. Leakage from plant compressed-air systems frequently goes unnoticed for years, and it would be difficult for the plant manager to locate the leakage, particularly if valving to isolate portions of the system were not available.

In most fluid distribution systems of the types described, fluid drawn for useful purposes is drawn intermittently, while leakage occurs continuously while the system is in operation. A device described by Meyer (U.S. Pat. No. 4,518,955) detects leakage by determining whether or not flow is above two preset values, and indicating leakage if the flow exceeds either of these values for a corresponding period of time. The device involves a mechanical flow sensor, capable of distinguishing specific levels of flow.

A device described by Abe (U.S. Pat. No. 4,437,336) determines when the flow rate is below a predetermined value. It integrates the flow during such periods, taking it to be leakage flow. This approach has the obvious disadvantage of not distinguishing high rates of leakage from low rates of useful flow.

A number of thermal fluid flow sensing devices have been developed. They apply heat to a fluid, usually at a fixed rate, and take a rise in the temperature at a point in the fluid, usually relative to the temperature at another point in the fluid, as an indication that flow has stopped. They differ from thermal flowmeters in that they are designed for maximum sensitivity to small rates of flow, rather than for predictable response to a range of flow rates.

One such thermal fluid flow sensing device is described by Seeley (U.S. Pat. No. 3,438,254). It consists of a heating coil for warming the pipe through which the fluid flows, temperature-sensing coils wound around the pipe for sensing its temperature at specific points, and, optionally, a check valve in the pipe to block convection currents and to improve the sensitivity of the device. The preferred embodiment is intended for monitoring the flow of fluid from an oil well. The device, as described, could not be applied to an existing pipe in place and in service.

A second thermal fluid flow sensing device, again a device for detecting flow at oil wells, is described by Densmore (U.S. Pat. No. 3,570,310). It consists of a heating element and a temperature-sensitive switch, both affixed to the outside of a pipe. If there is no flow, the pipe is warmed sufficiently by the heater to activate the switch. As described, it requires having its components welded to the pipe in order to assure adequate thermal contact. This device would have to heat the pipe well above the highest expected room temperature before a stoppage of flow could be reliably determined. Consequently, its response would be slow and its heat requirement would be large.

An externally-mounted flowmeter is described by Tobin in an article entitled "Development of a Clamp-On Flowmeter" in the Proceedings of the 18th International ISA Symposium, vol. 18, May 1972 pp. 338-340. This device measures flow by determining the amount of heat required to maintain a fixed temperature difference between two sensors. It is described as being applied to one-quarter-inch hydraulic lines.

It will therefore be seen that the problem of detecting and indicating leakage from service water systems has been addressed, but only by means which require disruption of the water system and the use of skilled labor for installation. The devices also do not make good use of the history of the fluid flow rate in estimating the likely existence of leakage and the probable magnitude of such leakage. It will also be seen that the use of thermal fluid flow detectors is well known, though applications to existing piping systems without system disruption are rare. In most cases, applications are to small-diameter pipes, in which circulating flow caused by natural convection (with no net flow along the pipe) is less significant than it is in larger pipes. Leak detectors for domestic water distribution systems have not employed the technology of thermal fluid flow detection.

SUMMARY OF THE INVENTION

The primary object of the invention is to provide a convenient, inexpensive means of monitoring a variety of types of fluid systems for leakage. The low cost of the device could lead to its wide application in types of systems in which no form of leak detection is now commonly employed. Its widespread use could result in major savings of cold water, hot water and compressed air, and to consequent savings of energy used in heating water, in pumping and treating water, and in compressing air.

It is a further object of this invention to provide such a leak detector that is configured for removable external mounting on an existing pipe.

It is a further object of this invention to provide such a leak detector that will provide a graduated response to the rate and the duration of leakage.

It is a further object of this invention to provide a flow detector which is insensitive to uniform temperature gradients along a pipe to which it is applied.

In a fluid distribution system with intermittent useful flow, the rate of leakage may be taken as the minimum rate of flow occurring between periods of useful flow or otherwise as the minimum rate of flow that occurs from time to time. The invention includes leak-detection circuitry to make advantageous use of analog signals representative of flow rate, including highly non-linear signals that are available from a thermal fluid flow detector. It also includes improvements to known designs of thermal fluid flow detectors to produce a device that is low in cost and suitable for removable installation on the outside of a pipe.

In a preferred embodiment, the flow detector of this invention is a thermal fluid flow detector made sufficiently inexpensive for its intended application in part by having all of the heating and temperature-sensing components mounted on a printed circuit board, permitting automated assembly of these components. The accuracy and reliability of the output of the device are dependent in part on the effectiveness with which the temperature-sensing elements can be isolated from the thermal influence of the heating element and of the environment while one of the temperature-sensing elements is preferably placed quite close to the heating element. This isolation is provided in part by the shaping of the printed circuit board and the placement of foils on the board, in part by the use of a thin circuit-board material, and in large part by substantially surrounding each of the temperature sensors with a thermally-conductive barrier in close thermal contact with the pipe, these barriers consequently being at a temperature close to that of the pipe. The temperature sensors are in much better thermal contact with the pipe than with the barrier, and thus they are maintained much closer to the temperature of the pipe than to that of the barrier. (The concept of surrounding a temperature-sensing element with a thermally-conductive barrier has been disclosed in my co-pending application Ser. No. 07/772,234 filed Oct. 7, 1991, which is incorporated herein by reference.) Through these various means, it is possible to combine in a small package elements that apply heat to a pipe and elements that are highly sensitive to temperature differences that are induced along the pipe.

An alternative embodiment provides for the use of four temperature-sensing elements, and the placement of two of the temperature-sensing elements at locations on the pipe remote from the heating element, and at equal distances in opposite directions. This embodiment would be preferred for large horizontal water pipes, in which thermally-induced convection flow would tend to dominate over the flow that was to be detected, and for air lines, in which the heat transfer between the fluid and the pipe wall is poor. The use of two remote sensors, with their signals averaged, would compensate for temperature gradients existing along the length of the pipe.

In another embodiment, the leak detector would measure the temperature of the unheated pipe and the ambient temperature and compare the two. This embodiment would be useful in situations in which the incoming fluid temperature was consistently well above or well below the ambient temperature. Its normal application would be to an incoming water pipe; it would preferably be placed close to the service entrance. Its main advantage would be its suitability for battery-powered operation.

Yet another embodiment of the invention would employ a signal representative of flow from a water meter and apply to it the same leak-detection algorithm as is used with the signal from the thermal flow detector. The principle of the invention is applied: to generate a signal representative of a minimum flow rate and to interpret this signal as an indication of leakage.

It is desirable for the device of this invention to provide a graduated response to leakage, so that a dripping faucet produces a different signal than a continuously-running toilet. It is also desirable to have reasonably fast indication of a leak, but not to have excessive alarm created because of a long period of continuous use. It is further desirable for the output of the unit not to change suddenly at arbitrarily-set levels of flow or periods of time, because, if this is done, information about the probable magnitude or duration of the leak is necessarily lost. The device addresses all of these issues by generating a signal representative of a time-weighted minimum of the flow rate and by generating audio and visual output signals that increase in intensity as this time-weighted minimum increases. Thus, toward the end of an excessively-long shower, the audio output would begin to chirp, at widely-spaced intervals. When the shower was turned off, the chirping would stop. If a faucet dripped rapidly overnight, the chirping would become more frequent, and if a toilet mechanism had failed, causing continuous flow, the chirping would, over a period of a few hours, become quite rapid. Correction of the leak, and the resulting full cessation of flow, would silence the output.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE PREFERRED EMBODIMENT

The preferred form of the invention is illustrated in FIGS. 1, 2, 3 and 4. The thermal flow detector, the electronic circuitry for establishing the presence of leakage, and the annunciating means are combined into one device which is adapted to be mounted to the outside of a pipe. The pipe (not shown) is heated by a resistive element 1 printed on the underside of a printed-circuit board 2. This element is located near the downstream end of the printed-circuit board. An electrically-insulating coating 5 is applied over this element, thin enough to allow the ready transfer of heat. Two thermistors, 3 and 4, are surface mounted on the same printed circuit board. Thermistor 3 is located at the upstream end of the printed-circuit board while thermistor 4 is located close to the heating element. Other types of temperature-sensing elements, such as thermocouples, may alternatively be used with suitable modifications to the circuitry.

Figure 1:
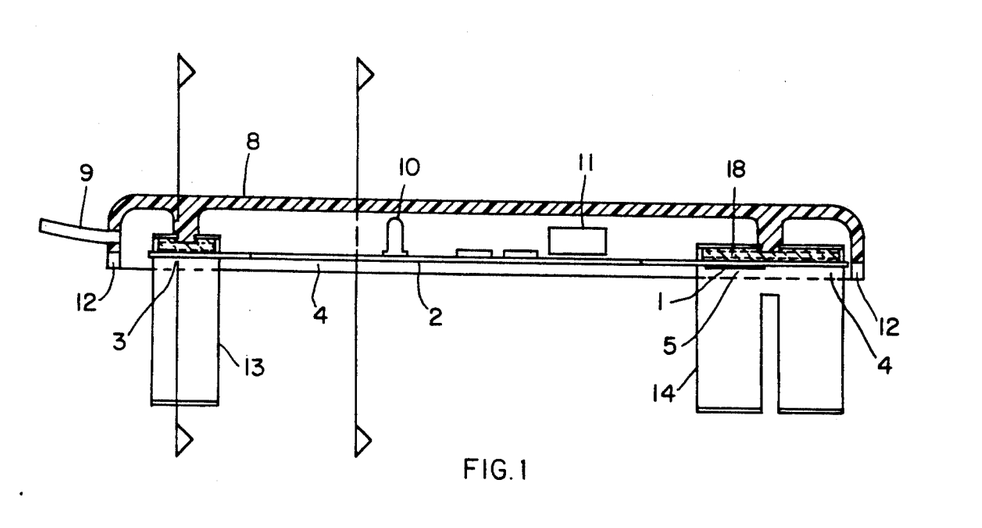
FIG. 1 is a longitudinal section through a preferred embodiment of the leak detector of this invention.

The printed circuit board includes a wide central portion on which the electronic components other than the thermistors and the heating element are mounted and two narrow end portions on which the thermistors and the heating element are mounted. The end portions are made narrow in order to facilitate thermally isolating them, and the thermistors and the heating element mounted on them, from the remainder of the device.

Figure 2:
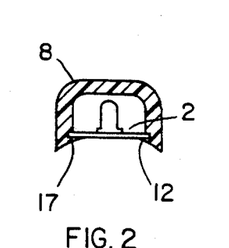
FIGS. 2 and 2A are cross sections through the same embodiment.

The circuit board is enclosed in a translucent plastic housing 8. The board is retained in place by indentations 17 on the inner surfaces of the housing. A two-, three- or four-wire cable 9 extends from one end of the device to a connector arranged to provide power to the device and to receive signals from the device. Additional electrical components are mounted on the printed circuit board. These include a light-emitting diode 10 and an electronic chime 11 which are provided for annunciation.

The unit will normally be mounted on top of a horizontal, uninsulated pipe. It may, if necessary, be installed on a vertical pipe, with some loss of sensitivity. The housing is designed in such a way that the display may be viewed from either side, even when the unit is mounted on a horizontal pipe near the ceiling. A curve 12 is cut into the underside of each end of the housing to conform to the curvature of the pipe. The housing will preferably not touch the pipe.

Figure 2A:
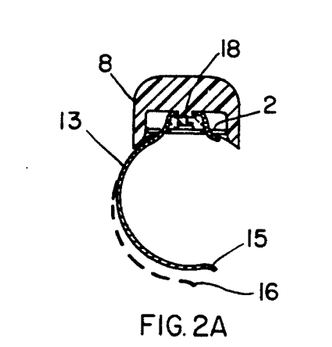

The device is affixed to the pipe with two spring clips 13 and 14. Each of these is affixed to the body of the device by mechanical engagement with a suitably-shaped protrusion on the plastic body. The engagement of each clip with the body of the device is made at only one point in order to allow the clip to align itself with the pipe. The clips are fabricated of a material, such as beryllium copper, having a relatively high elastic limit and a relatively high thermal conductivity. Each clip is configured to substantially surround the surface of the printed circuit board that faces away from the pipe and to be in good thermal contact with the pipe on both sides of the printed circuit board. The upstream clip 13 is shown in its relaxed position 15 and in the position it would assume when mounted on a pipe 16. The portion of the clip above the printed circuit board is lined with a resilient, thermally-insulating material 18 such as foam rubber. The thickness of this material is such that it will press the circuit board against the pipe without at the same time preventing the nearby portions of the spring clip from making firm contact with the pipe. The clip 14 at the downstream end of the circuit board is sufficiently wide to cover both the heating element and the thermistor and it is made with two arms partially surrounding the pipe to ensure that it will fit tightly to the pipe at both of its ends.

Figure 3:
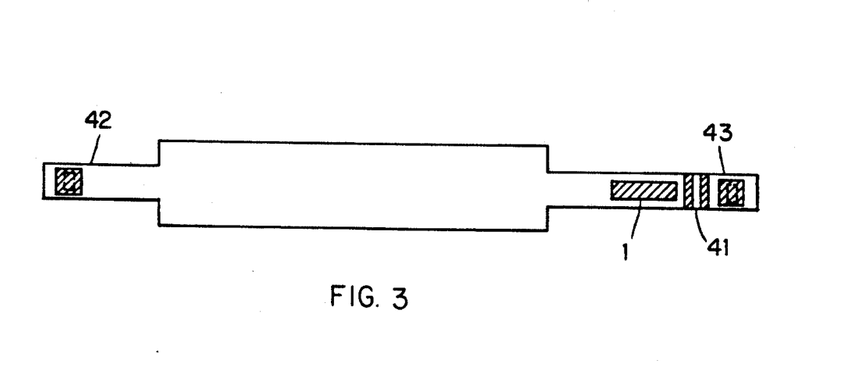
FIG. 3 illustrates the preferred arrangement of foils on the underside of the printed-circuit board of FIG. 1 to control the flow of heat.

Since the foils on the circuit board are thermally conductive, their arrangement is critical to the proper thermal performance of the device. In particular, the tendency of the downstream thermistor to be warmed by heat conducted along the circuit board from the heating element must be minimized. A possible arrangement of foils on the underside of the board to this end is shown in FIG. 3. Foils 41 between the heating element and the downstream thermistor run across the board, transverse to the direction of unwanted heat flow. At the same time they run in a direction of desired heat flow from points at the sides of the board to the center which is in contact with the pipe. Additional foils, 42 and 43, are placed beneath the thermistors to improve their thermal contact with the pipe.

Also shown in FIG. 3 is the heating element 1 which is printed or screened onto the underside of the board. This element is shaped to be long and narrow and located on the centerline of the board to maximize its thermal contact with the pipe.

Figure 4:
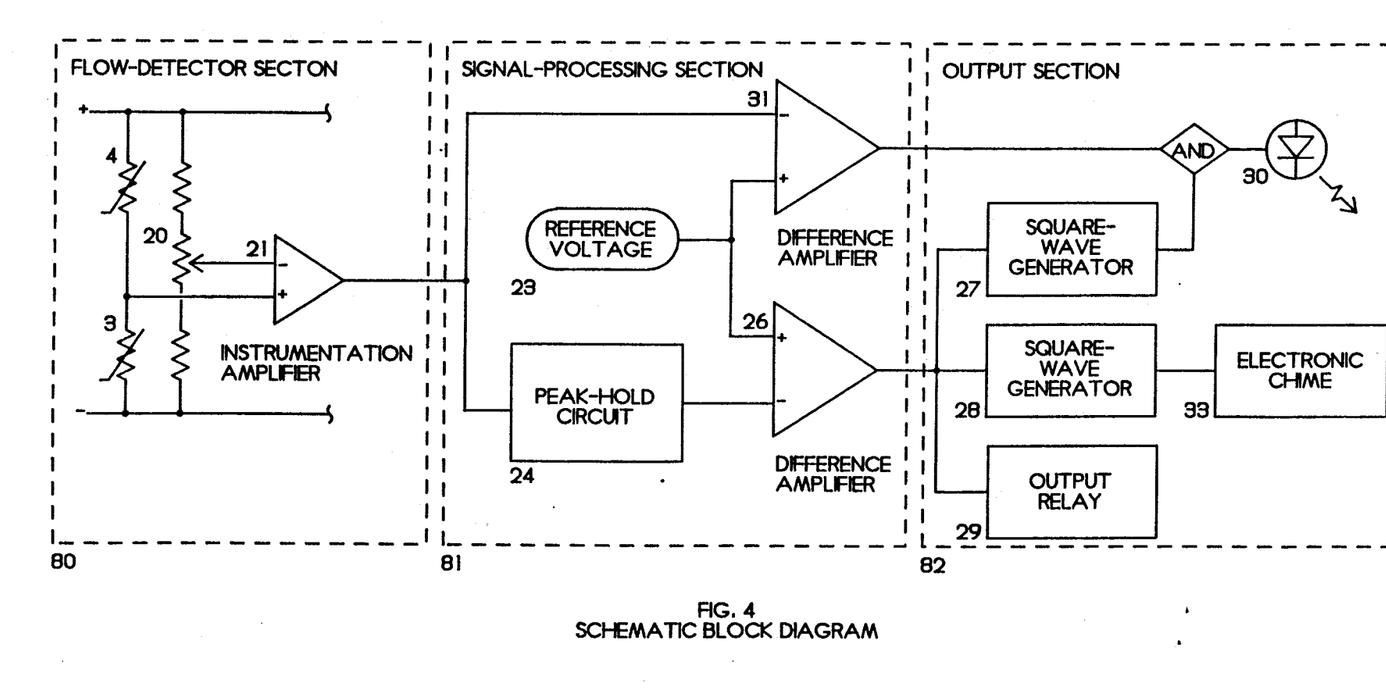
FIG. 4 is a schematic block diagram of a preferred embodiment of the circuitry of the device of FIG. 1.

The necessary electrical circuitry is illustrated in FIG. 4. The circuitry is divided into three sections, a flow-detector section 80, a signal-processing section 81 and an output section 82. The flow-detector section generates an electrical signal representative of flow. This signal is a function of measured temperature differences; it increases as the flow rate decreases. The signal-processing section operates on the output of the flow-detector section to generate two signals, one representative of the current flow rate and one representative of a time-weighted minimum flow rate, which is the estimate of leakage. The output section generates audio, visual and contact-closure outputs on the basis of the current and time-weighted minimum flow rates.

The flow-detector section consists of thermistors 3 and 4 connected as a voltage divider, instrumentation amplifier 21, and potentiometer 20 between two resistors to provide a zero adjustment. The thermistors are selected to have closely matched curves so that, in response to a given change in temperature, the percentage change in the resistance of one is equal to the percentage change in the resistance of the other. The voltage to the thermistors and to the potentiometer and its associated resistors is from a regulated supply. When the temperatures of thermistors 3 and 4 vary together, the resistances of these thermistors vary in equal proportion and the output of the voltage divider is essentially constant. When the temperature of the thermistor 4 that is closer to the heating element rises in relation to the temperature of thermistor 3 which is remote from the heating element, the resistance of thermistor 4 is reduced and the output of the voltage divider rises. At a time when the temperatures of the two thermistors are equal, or alternatively at a time when the device is in place, the heating element is activated and the flow rate is high, potentiometer 20 is adjusted to zero the output of the instrumentation amplifier.

In the signal-processing section 81, the output of the flow-detector section is monitored by peak-hold circuit 24. Circuit 24 operates in accordance with the following relations, where X is the input to the circuit and Y is its output:

For $X > Y$ (input higher than output, flow lower than estimated minimum)

$dY/dT = (X - Y) * (1/T1)$

For $X < Y$ (input lower than output, flow higher than estimated minimum)

$dY/dT = (X - Y) * (1/T2)$

T1 and T2 are time constants, T1 typically being a few minutes and T2 being one to several hours.

During a period of low flow, the output of this circuit rises relatively quickly to the voltage corresponding to that rate of flow. This rate of rise is determined by time constant T1. If too short a time constant is selected, the circuit may respond to false indications of no flow, such as may be caused by a sudden drop in the temperature of the water passing through the thermal flow detector. During a period of increased flow, the output of the circuit drops very slowly, as determined by time constant T2. This time constant is set long enough that normal intervals of usage will not be interpreted as leakage. The output voltage consequently tends to maintain a value representative of the minimum flow rate that occurs between periods of intentional use.

Figure 4A:
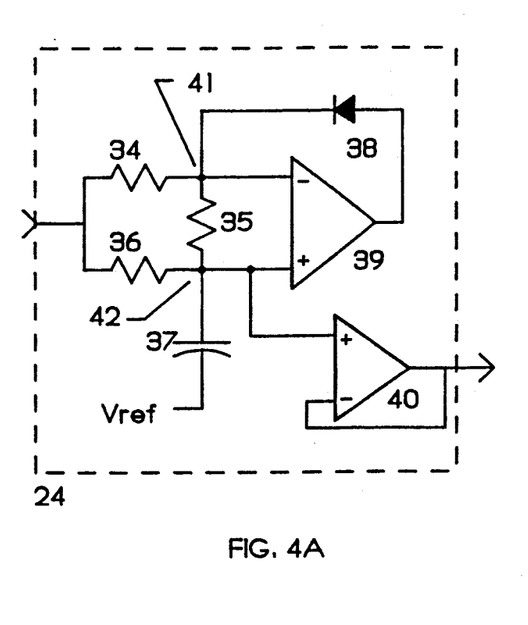
FIG. 4A is a schematic wiring diagram of the peak-hold circuit that is included in FIG. 4.

A possible design of the peak-hold circuit 24 is illustrated in FIG. 4A. Capacitor 37 is a low-leakage device suitable for timing service. The stored peak voltage is maintained at node 42 at the anode of this capacitor. Resistors 34, 35 and 36 determine the rate of charging and discharging of the capacitor in relation to the difference between the stored voltage and the input voltage. Operational amplifier 39 and diode 38 prevent the voltage at terminal 41 from falling below that at terminal 42, and thereby prevent the capacitor from discharging through resistors 34 and 35. Operational amplifier 39 is selected to have a sufficiently low input offset voltage that the capacitor will neither charge nor discharge at a significant rate as a result of this voltage acting across resistor 35. Time constant T1 is the RC time constant resulting from capacitor 37 charging through the series combination of resistors 34 and 35 placed in parallel with resistor 36. Time constant T2 is the RC time constant resulting from capacitor 37 discharging through resistor 36, which is many times larger than resistors 34 or 35. Operational amplifier 40 is connected as a unity-gain follower. It provides a low-impedance output for the circuit and isolates node 42 from the output.

For the particular size, orientation and material of pipe and for the fluid for which the device is to be used, a reference voltage 23, FIG. 4, is programmed into the device by selection of resistors or adjustment of a potentiometer or by adjustment of the program in a microcontroller, if a microcontroller is used. This reference voltage sets the sensitivity of the device, determining the temperature difference below which flow will be deemed to exist. As has been discussed above, it is important not to set this voltage too high, thus making the device sensitive to excessively small flow rates which may result from natural convection.

The output of peak-hold circuit 24 is compared with this reference voltage by difference amplifier 26. If the reference voltage is greater, a leak is deemed to exist. The output of the flow-detector section is compared with the reference voltage by difference amplifier 31. If the reference voltage is greater, detectable flow is deemed to exist. The outputs of these two difference amplifiers constitute the outputs of the signal-processing section. Both increase with increasing flow rate. For clarity, the output of difference amplifier 26 will be referred to as the minimum flow signal, while the output of difference amplifier 31 will be referred to as the current flow signal.

The output section includes square-wave generators 27 and 28 and output relay 29, all three of which are controlled by the minimum flow signal. The square-wave generators are activated when the minimum flow signal is greater than zero, and the interval between pulses from the square-wave generators decreases with increased voltage input, indicating increased leakage. Square-wave generator 27 controls the flashing of light-emitting diode 30; provision is made for this diode to remain lighted if the input to the square-wave generator is zero or negative, indicating no leakage. Square-wave generator 28 controls electronic chime 33. This chime is silent when there is no leakage. Thus the frequency of beeps from the electronic chime and the frequency of flashes from the light-emitting diode increase with decreasing voltage output from the peak-holding circuit, and thus with increasing magnitude or duration of leakage. The brightness of light-emitting diode 30 is controlled by the current flow signal. Output relay 29 picks up at an adjustable voltage, this voltage being set in accordance with the leakage rate at which a contact-closure output is desired.

It will be apparent to those skilled in electronics that some of the functions described would be performed better by digital circuitry than by analog circuitry and that, in particular, the peak-hold function with a long time constant would be most practical with digital circuitry. Therefore, while for simplicity the functions are described as being performed by analog circuitry, it is to be understood that, where appropriate, digital circuitry would be substituted and that all of the circuitry in the signal-processing section, and that in the output section up to the final output devices could be replaced with a microcontroller having one analog input and sufficient digital outputs for control of the relay, the electronic chime, and the brightness of the LED in several stages. Necessary interfaces to those devices would be provided.

Figure 5A:
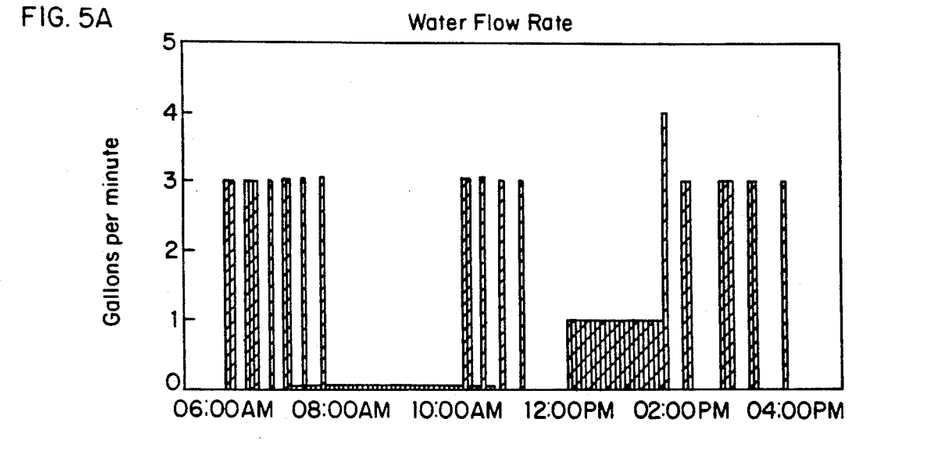
FIGS. 5A through 5C are graphs illustrating the operation of the embodiment of FIGS. 1-4.
Figure 5B:
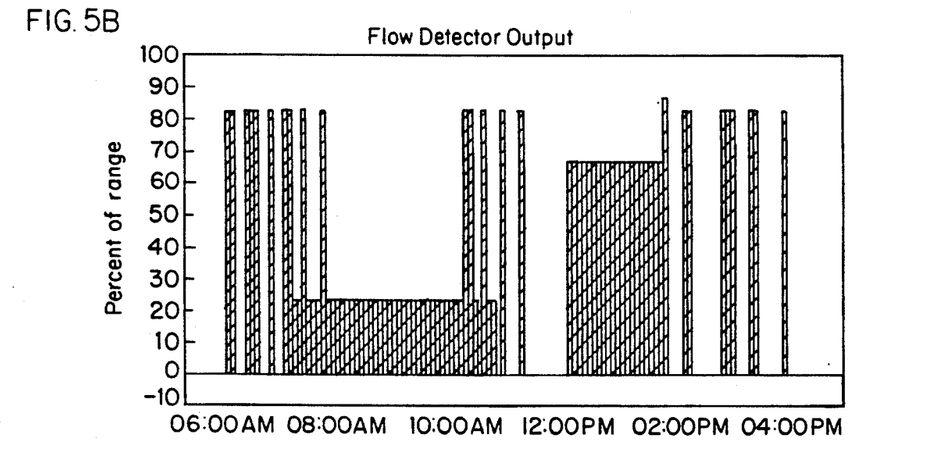
Figure 5C:
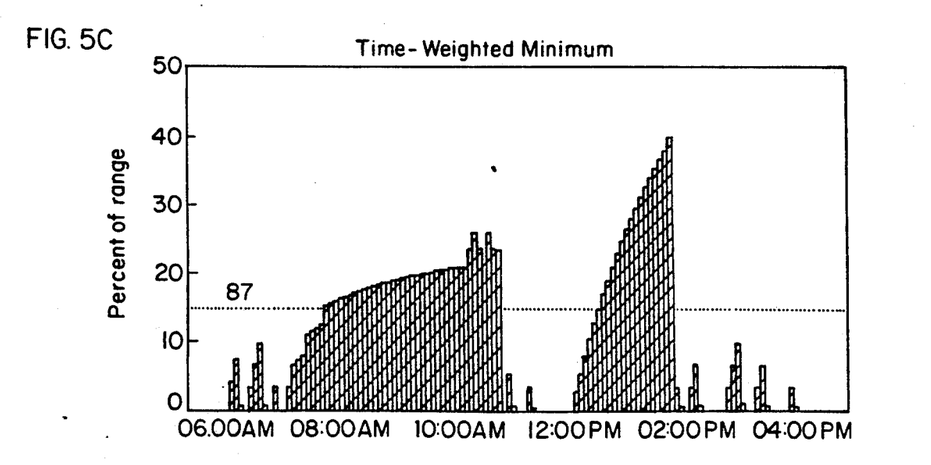

The three graphs in FIGS. 5A through 5C illustrate the operation of the device. The first is a plot of the flow that might occur in a residence. Each bar represents a 5-minute period of use, and shorter periods of use are ignored, for clarity. The graph indicates a 0.04 gpm leak (such as a rapidly-dripping faucet) and later a gpm leak (such as a failed toilet mechanism). Arbitrary periods of normal 3 gpm usage are superimposed.

The second graph, FIG. 5B, illustrates the output of the flow detector in response to the flow rates indicated in the first graph, FIG. 5A. The output is shown as a percentage of full scale. The graph is intended to illustrate the nature of the output of the device; the actual voltage response to flow variations would vary with details of construction of the device and with characteristics of the pipe and fluid. It will be seen that the device is much more sensitive at low flow rates than at higher flow rates. In the actual circuitry illustrated in FIG. 4, the flow would be represented by a signal that would decrease with increasing flow rate. For clarity, the signal is shown as increasing with flow rate in the graph.

The third graph, FIG. 5C, indicates the signal representative of the time-weighted minimum flow rate. A horizontal line on this graph indicates the lowest signal level at which leakage would be indicated. It will be seen that the periods when leakage is indicated correspond closely to the periods when leakage actually occurs.

ALTERNATIVE EMBODIMENTS

Figure 6:
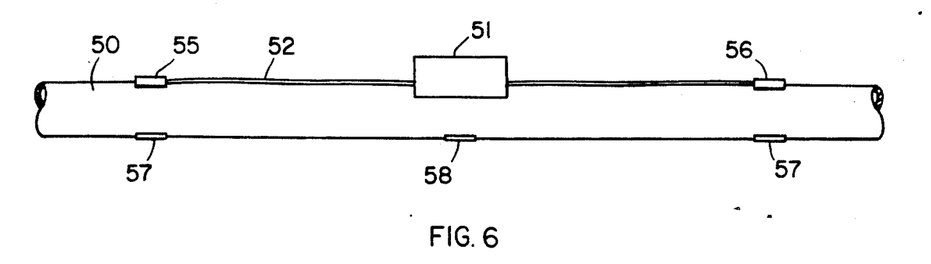
FIG. 6 is an elevation view of an alternative embodiment of the invention for use on compressed-air lines and on large water lines.
Figure 6A:
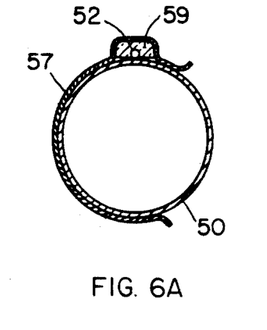
FIG. 6A is a cross section through the same embodiment.
Figure 6B:
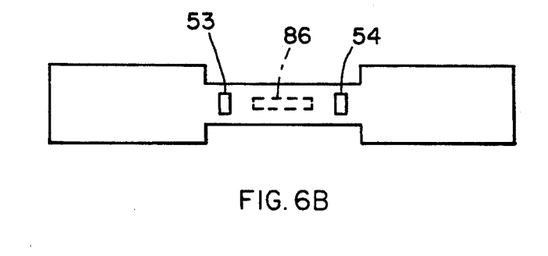
FIG. 6B is a top view of the circuit board located in the central portion of the same embodiment.

FIGS. 6, 6A and 6B illustrate an alternative embodiment which is adapted for commercial and industrial use, particularly on larger water lines and on compressed-air lines. The electronic circuitry, the heating element, two temperature sensing elements, thermistors 53 and 54, and the means of annunciation are housed in the body of the device, 51, which is affixed to the pipe, 50, by a spring clip, 58. Two additional temperature sensing elements, thermistors 55 and 56, are mounted independently of the body of the device and are connected to the body by cables 52. Each remote thermistor is held in thermal contact with the pipe and thermally shielded by a thermally-conductive spring clip 57. The spring clips resemble those in FIG. 1 and FIG. 2. They are thermally insulated from the thermistors with a resilient material such foam rubber. FIG. 6B is a top view of the printed circuit board that is within the body of the device. Thermistors 53 and 54 are on the upper surface of a narrow central section of the printed circuit board, while the heating element, 86, is on the underside and is shown hidden.

The circuitry for this embodiment would be similar to that illustrated in FIG. 4 except that thermistors 55 and 56 would be wired in parallel and in place of thermistor 3, while thermistors 53 and 54 would be wired in parallel in place of thermistor 4. Thermistors 53 and 54 could be replaced with a single thermistor to one side of the heating element. If this were done, for best performance thermistors 55 and 56 should be equidistant from the single thermistor and the single thermistor should have half the resistance of the other thermistors.

The purpose of the arrangement of thermistors in this embodiment is to render the device insensitive to a uniform temperature gradient existing along the pipe. In general, this can be accomplished as follows. Assume that there is an arbitrary number of temperature sensors included in the device. If a particular sensor is designated by the number i, its position along the pipe in an arbitrary coordinate system is $P_i$ and its influence on the output of the flow detector (the derivative of the output with respect to the sensed temperature) is $S_i$. In order for the device to be insensitive to average pipe temperature, the sum over all i of $S_i$ must be zero. In order for the device further to be insensitive to a uniform temperature gradient along the pipe, the sum over all i of the product $S_iP_i$ must also be zero. Many arrangements of sensors will meet this requirement, including those in which sensors having equal influence on the output of the device are arranged symmetrically about a common reference point along the length of the device.

For convenience, the sensors may be divided into two groups: the local sensors, located relatively close to the heating element and thus more warmed by the heating element and having a positive influence on the output signal (an increased output indicating reduced flow); and the remote sensors, being located relatively far from the heating element and having a negative influence on the output signal.

Many methods of processing the signals from the individual sensors would achieve the desired result. If it were chosen to give all of the sensors within each group an equal influence on the output, the signals from the sensors in each group could be averaged and the results compared or equivalently signals from pairs of sensors, one in each group, could be compared and the results summed or averaged, or the signals could be processed in numerous other ways, given the conditions cited above that are required in order for the output of the device to be insensitive to a uniform temperature gradient along the pipe. The sensors in the embodiment of FIGS. 1-4 are not arranged to be insensitive to uniform temperature gradients doing so would create difficulties with packaging and with thermal isolation of the elements. However, for applications in which the temperature of the fluid approaching the device could vary, this combination of features should be considered.

Certain features of the circuit that are fixed in FIG. 4, such as the time constant in the peak hold circuit and the reference voltage, would be made adjustable by the substitution of potentiometers for fixed resistors or by provision for modifying the program of a programmable microcontroller. These adjustments would be provided in order to permit the user to adapt the device to various operating conditions.

Figure 7:
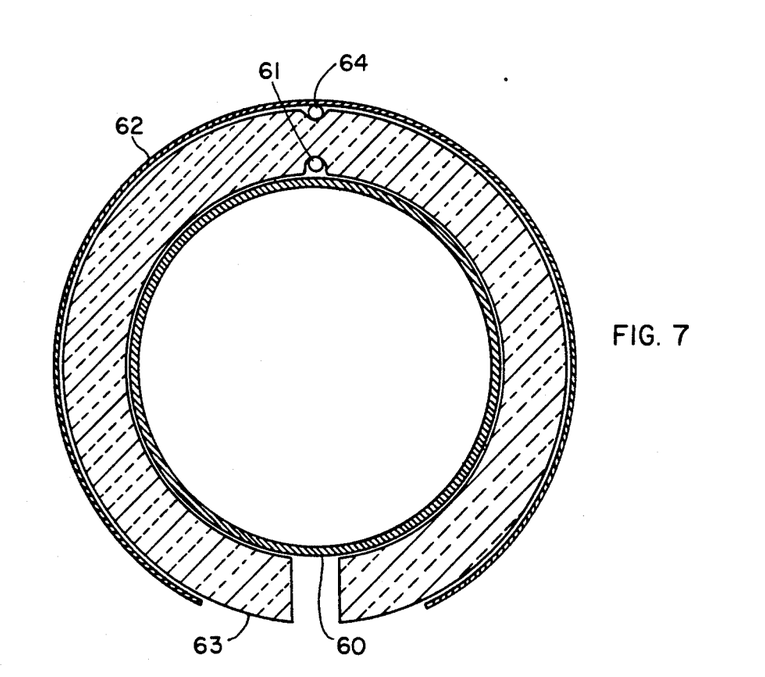
FIG. 7 is a cross-sectional view of another alternative embodiment that does not require the application of heat to the pipe.
Figure 7A:
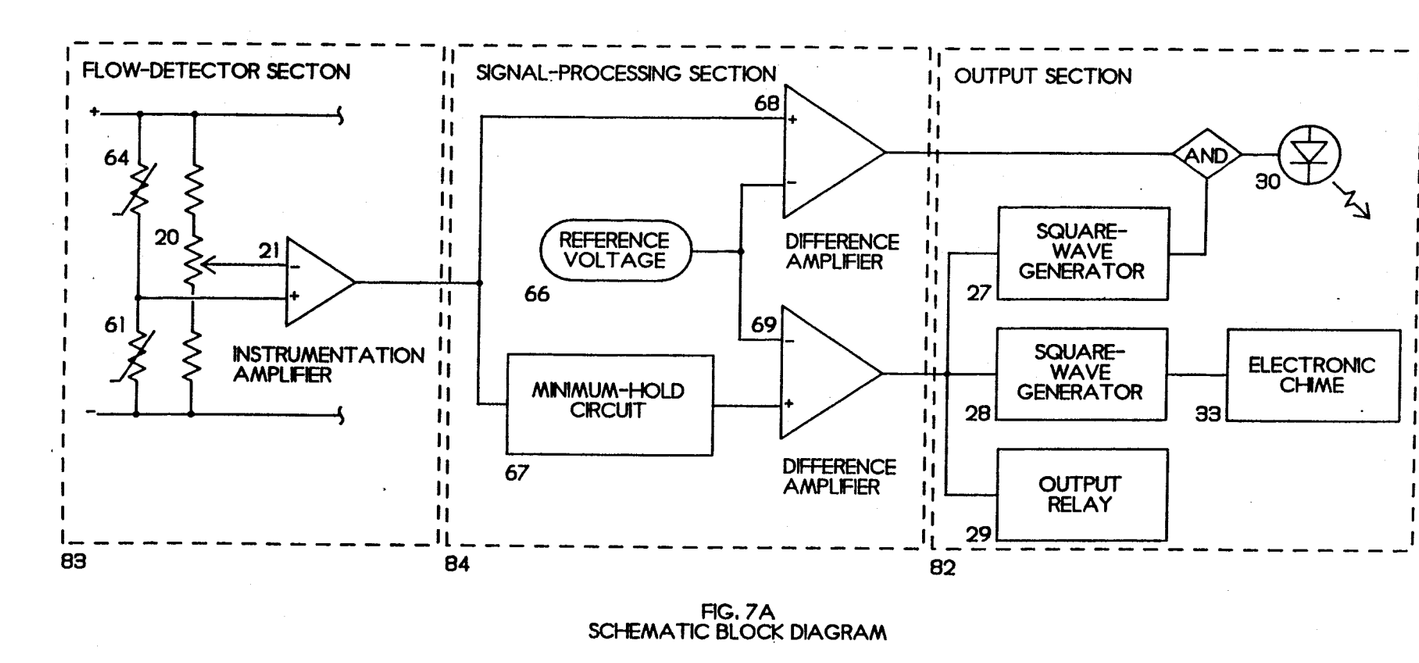
FIG. 7A is a schematic block diagram of the circuitry of the embodiment of FIG. 7.

FIG. 7 illustrates an alternative embodiment in which the pipe is not heated. The temperature of the pipe 60 is sensed by thermistor 61. A thermally-conductive band 62 is placed around the pipe, spaced from the pipe by insulating layer 63. Thermistor 64 senses the temperature of the band as indicative of the ambient temperature. The required circuitry for this embodiment is illustrated in FIG. 7A. The circuit closely resembles that in FIG. 4 and FIG. 4A, except that it is modified to allow for the full-flow condition being represented by a large temperature difference rather than by a small temperature difference. In the flow-detector section 83, thermistors 61 and 64 replace thermistors 3 and 4, respectively. The circuit is zeroed under a no-flow condition, when the temperatures at the thermistors are equal. The output of the flow detector section increases with increasing flow (the sensitivity being heavily dependent on the temperature of the incoming water and the heat-transfer characteristics of the pipe between the source of the water and the flow detector).

In the signal-processing section 84, the peak-hold circuit is replaced with minimum-hold circuit 67, which is identical to the peak-hold circuit in FIG. 4A except for the polarity of diode 38 being reversed. The capacitor maintains a minimum voltage and is prevented from charging through resistors 34 and 35. Since flow is now represented by increasing voltage, the polarities of the difference amplifiers are reversed; the function of the reference voltage remains the same. The output section 82 is unchanged.

This unheated embodiment could be modified by the addition of a heating element to warm the pipe, creating another form of thermal fluid flow detector that could be employed in the invention for leak detection.

Figure 8:
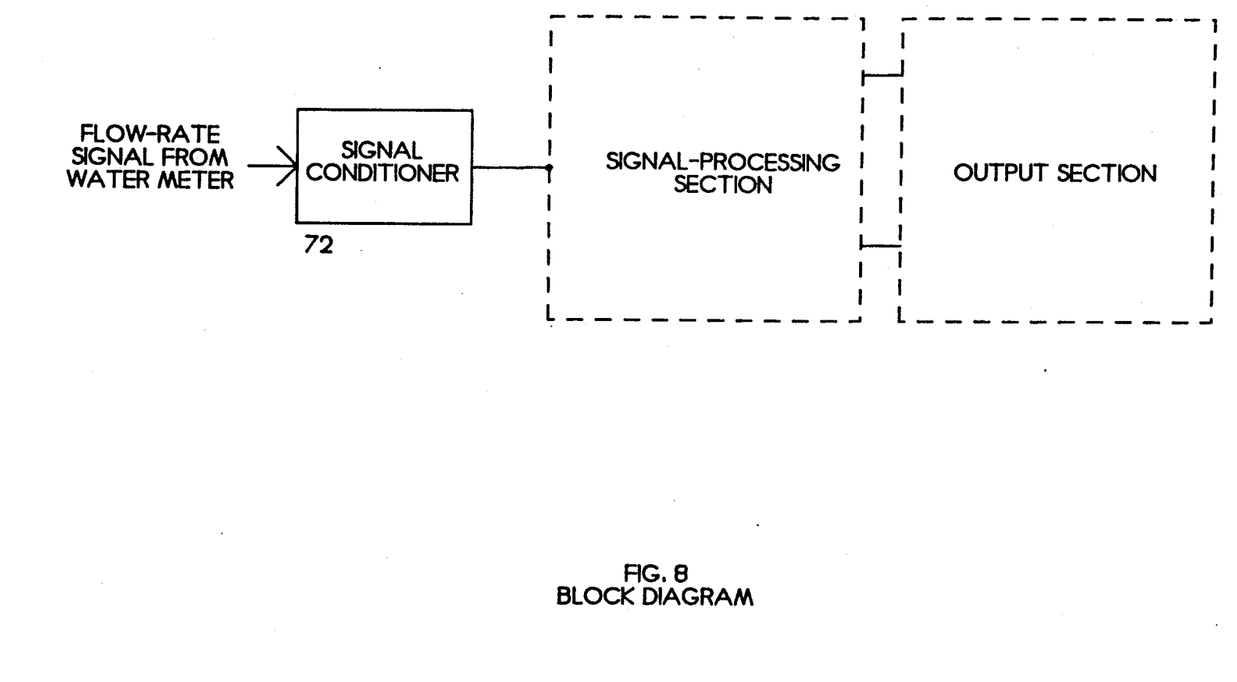
FIG. 8 is a block diagram of yet another alternative embodiment for use in conjunction with, or as a part of, a utility water meter.

The invention could be used in conjunction with a utility water meter, as illustrated in FIG. 8. An electronic signal representative of flow, usually in the form of a pulse train, would be generated by a portion of the existing meter. This signal would be converted into an analog voltage signal representative of the flow rate by signal conditioner 72. The voltage signal would preferably be of the form:

$$E = C1*[1/(Q+C2)]$$

where:
E is the voltage signal
Q is the flow rate, and
C1, C2 are constants.

This signal would then be processed in the same manner as is the output of the flow detector section in FIG. 4. The signal-processing section 81 and the output section 82 would be the same as those in FIG. 4 and the same range of audible, visual and contact-closure outputs would be made available as indications of both the current flow and the degree of leakage, as based on the time-weighted minimum flow.

APPLICATION CONSIDERATIONS

Several precautions should be taken in the use of the thermal flow detector to ensure consistent and reliable operation.

First, the device should preferably be placed on a horizontal section of pipe, as far removed as possible from vertical piping rising from the level of the horizontal pipe. Alternatively, it may be placed near the top of a vertical section of pipe connecting to a horizontal pipe with no further rises nearby. When applied to a vertical pipe, the direction of water flow should be upward and the temperature of the entering water should be no greater than the ambient temperature. Locations where the pipe temperature at the device and upstream of the device will be influenced by nearby hot pipes, by drafts or by similar factors should be avoided.

Second, the maximum temperature difference observed between the temperature sensors should not be used as a point of reference in zeroing the device, particularly when it is applied to cold water systems. Rather, the preferred method of zeroing discussed above should be used. When there is no net flow along the pipe, the heat removal from the portion of the pipe near the heating element is dominated by natural convection effects; these are heavily influenced both by geometry and by the variation in fluid properties with temperature. Thus, when there is no significant flow to be detected, the device becomes sensitive to conditions that are highly variable and are better ignored. In addition, in domestic water systems, there tend to exist flows at extremely small rates that are of no interest. The principal flow in this category is that due to the expansion and contraction of water in water heaters.

Third, the spacing of the temperature sensors must be determined by the tradeoff between reliable and sensitive response, which favor wide spacing, and rapid response and insensitivity to local thermal influences, which favor close spacing.

Fourth, for maximum sensitivity and reliability, the device should be installed with a silicone heat-transfer compound or other suitable thermally-conductive material placed between the circuit board and the pipe.

Certain modifications could be made to the device to adapt the unit to larger pipes, to lower flow rates in relation to pipe size, to the need to detect brief periods of flow stoppage in systems with many users, and to the need for lower electricity usage in order to permit a battery-powered unit. The following modifications in particular could be applied:

a) When the sensed temperature difference became sufficient to indicate that detectable flow did not exist, power to the heating element could be turned off, and power could be applied to the heating element only as necessary to maintain this temperature difference.

b) The heating element could be modified to provide better thermal contact with the pipe and better thermal isolation from the nearby thermistors by forming it of a flexible material with a soft, thermally- and electrically-insulating backing so that it could conform to the surface of the pipe.

c) A battery-powered device, with microprocessor control, could activate itself to perform a test once every few hours or every few days. During each test it would check for flow repeatedly. If a no-flow condition was established, it would shut itself down until the next scheduled test. If flow was found to be continuous, it would indicate a leak.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A thermal fluid flow detector for detecting fluid flow in fluid distribution system pipe, comprising:
a heating element for placement in thermal contact with the pipe;
means for determining the temperature of the pipe at at least three locations spaced lengthwise along the pipe; and
means, responsive to said means for determining, for generating an output signal representative of flow rate such that the sum of the derivative of the output signal with respect to each sensed temperature multiplied by the position of the corresponding sensor in a common coordinate system representing position along the pipe is zero.

2. The thermal fluid flow detector of claim 1 in which said means for determining includes means for resolving the pipe temperature at two spaced locations in each direction from the heating element along the pipe.

3. The thermal fluid flow detector of claim 1 in which said means for determining includes means for resolving the pipe temperature at two locations remote from the heating element and at at least one local location closer to the heating element than either remote location.

4. The thermal fluid flow detector of claim 3 in which said means for generating an output signal includes means for averaging the temperatures at the remote locations and means for comparing the averaged temperatures to a temperature at a local location.

5. A device for detecting leakage from a fluid distribution system having periods of useful flow and periods of no useful flow, the device not requiring measurement of flow out of the system, comprising:
means for generating a signal representative of a time-weighted minimum fluid flow rate into the system; and
means, responsive to said signal, for indicating the presence of a leak in the system.

6. The device of claim 5 further including means for mounting the device to a fluid distribution system pipe.

7. The device of claim 5 further including means for generating a signal representative of the fluid flow rate.

8. The device of claim 7 in which said means for generating a signal representative of flow rate includes means for applying heat to the system and resolving a temperature difference at points on the distribution system.

9. The device of claim 7 in which said means for generating a signal representative of flow rate includes means for measuring the difference in temperature between the system and its surroundings.

10. The device of claim 5 further including means for varying an output of said means for indicating the presence of a leak in the system in response to the leakage magnitude.

11. A device for detecting leakage from a fluid distribution system having periods of useful flow and periods of no useful flow, the device not requiring measurement of flow out of the system, comprising:
means for generating a signal representative of a minimum fluid flow rate into the system, including means for applying heat to the system and resolving a temperature different at points on the distribution system, and means for measuring the difference in temperature between the system and its surroundings; and
means, responsive to said signal, for indicating the presence of a leak in the system.

12. A device for detecting leakage from a fluid distribution system having periods of useful flow and periods of no useful flow, the device not requiring measurement of flow out of the system, comprising:

a thermal fluid flow detector for detecting fluid flow into the system;

means for nondisruptively mounting said detector to a distribution system pipe for determining leakage without taking said pipe out of service, said means for mounting including a spring clip in contact with the system pipe;

said thermal fluid flow detector including means for sensing system pipe temperature, and said spring clip surrounding said means for sensing system pipe temperature for maintaining said means for sensing system pipe temperature at a temperature close to that of the pipe; and means, responsive to said flow detector, for indicating the presence of a leak in the system.

13. The device of claim 12 in which said detector includes a heating device and temperature sensing devices electrically connected and independently mountable on the system pipe.

14. The device of claim 13 in which said means for mounting includes a spring clip surrounding each temperature sensing device for both contacting the system pipe and maintaining the temperature sensing device at a temperature close to that of the pipe.

15. The device of claim 12 in which said detector includes heating and temperature-sensing devices mounted on a printed-circuit board.

16. The device of claim 15 in which said means for mounting includes means for placing said board in thermal contact with the pipe.

17. A device for detecting leakage from a fluid distribution system having periods of useful flow and periods of no useful flow, without requiring measurement of flow out of the system, the system having a utility water meter with an output signal representative of flow, comprising:

means for generating, from the water meter output signal, a signal representative of a time-weighted minimum fluid flow rate into the system; and means, responsive to said means for generating, for indicating the presence of a leak in the system.

* * * * *